(12) United States Patent
Toshiyoshi et al.

(10) Patent No.: US 11,664,749 B2
(45) Date of Patent: May 30, 2023

(54) POWER SUPPLY CIRCUIT AND VIBRATION-DRIVEN ENERGY HARVESTER

(71) Applicants: The University of Tokyo, Tokyo (JP); Saginomiya Seisakusho, Inc., Tokyo (JP)

(72) Inventors: Hiroshi Toshiyoshi, Tokyo (JP); Hisayuki Ashizawa, Sayama (JP); Masahiro Morita, Sayama (JP)

(73) Assignees: The University of Tokyo, Tokyo (JP); Saginomiya Seisakusho, Inc., Tokyo (JP)

( * ) Notice: Subject to any disclaimer, the term of this patent is extended or adjusted under 35 U.S.C. 154(b) by 35 days.

(21) Appl. No.: 17/059,890

(22) PCT Filed: May 30, 2019

(86) PCT No.: PCT/JP2019/021616
§ 371 (c)(1),
(2) Date: Nov. 30, 2020

(87) PCT Pub. No.: WO2019/230916
PCT Pub. Date: Dec. 5, 2019

(65) Prior Publication Data
US 2021/0218351 A1 Jul. 15, 2021

(30) Foreign Application Priority Data
May 31, 2018 (JP) .............................. JP2018-105436

(51) Int. Cl.
*H02N 2/18* (2006.01)
*H02M 3/158* (2006.01)

(52) U.S. Cl.
CPC .......... *H02N 2/186* (2013.01); *H02M 3/1588* (2013.01)

(58) Field of Classification Search
CPC ....... H02N 2/186; H02N 1/08; H02M 3/1588; H02M 1/0022; H02M 1/007; H02M 7/06; H02M 3/155
See application file for complete search history.

(56) References Cited

U.S. PATENT DOCUMENTS

| 5,517,399 A | 5/1996 | Yamauchi et al. |
| 10,014,801 B2 * | 7/2018 | Horiguchi ............. H01L 41/083 |

(Continued)

FOREIGN PATENT DOCUMENTS

| JP | 11-341837 A | 12/1999 |
| JP | 2014-49557 A | 3/2014 |

(Continued)

OTHER PUBLICATIONS

International Search Report (PCT/ISA/210) issued in PCT Application No. PCT/JP2019/021616 dated Jul. 30, 2019 with English translation (three (3) pages).

(Continued)

*Primary Examiner* — Kyle J Moody
(74) *Attorney, Agent, or Firm* — Crowell & Moring LLP (57) ABSTRACT

A power supply circuit that outputs an electric power input from a vibration-driven energy harvesting element to an external load includes a rectifying circuit that rectifies an alternating current power input from the vibration-driven energy harvesting element; a first capacitor that accumulates a power output from the rectifying circuit; a chopper circuit that has a switching element controlling a chopper timing and has an input terminal connected to the first capacitor; and a control signal generation unit that supplies a control signal to the switching element, wherein: the control signal generation unit generates the control signal without referring to a voltage of the first capacitor.

16 Claims, 8 Drawing Sheets

(56) References Cited

U.S. PATENT DOCUMENTS

| | | | |
|---|---|---|---|
| 2008/0007237 A1 | 1/2008 | Nagashima et al. | |
| 2010/0079034 A1* | 4/2010 | Ramadass | H02N 2/181 |
| | | | 310/339 |
| 2011/0227543 A1* | 9/2011 | Ivanov | H02J 7/007 |
| | | | 320/163 |
| 2013/0140896 A1* | 6/2013 | Tzinker | H02M 3/156 |
| | | | 307/43 |
| 2013/0301323 A1* | 11/2013 | Iyasu | H02M 1/4233 |
| | | | 363/123 |
| 2014/0065751 A1 | 3/2014 | Suzuki et al. | |
| 2014/0098582 A1 | 4/2014 | Oki et al. | |
| 2017/0244317 A1* | 8/2017 | Kondo | H02M 7/12 |

FOREIGN PATENT DOCUMENTS

| | | |
|---|---|---|
| JP | 2014-75950 A | 4/2014 |
| JP | 2016-127656 A | 7/2016 |
| JP | 5990352 B1 | 9/2016 |
| JP | 6002497 B2 | 10/2016 |
| WO | WO 2011/115652 A1 | 9/2011 |

OTHER PUBLICATIONS

Japanese-language Written Opinion (PCT/ISA/237) issued in PCT Application No. PCT/JP2019/021616 dated Jul. 30, 2019 (four (4) pages).
European Search Report issued in EP Application No. 19812194.9 dated Jan. 14, 2022 in English (seven (7) pages).

* cited by examiner

POWER SUPPLY CIRCUIT AND VIBRATION-DRIVEN ENERGY HARVESTER

TECHNICAL FIELD

The present invention relates to a power supply circuit and a vibration-driven energy harvester.

BACKGROUND ART

As one of energy harvesting technologies for harvesting energy from environmental vibration, there is known an approach of generating an electric power from environmental vibration using a vibration-driven energy harvesting element which is a MEMS (Micro Electro Mechanical System) vibration element. The vibration-driven energy harvesting element itself includes a piezoelectric element or a capacitance-type element. When the element is vibrated at a frequency of environmental vibration, the element generates an alternating current power having the same frequency. Thus, there has been proposed a vibration-driven energy harvester that combines a vibration-driven energy harvesting element and a power supply circuit converting an alternating current power generated by the vibration-driven energy harvesting element into a direct current or alternating current having a voltage suitable for use (see PTL1, for example).

CITATION LIST

Patent Literature

PTL1: Japanese Patent No. 5990352

SUMMARY OF INVENTION

Technical Problem

Since vibration energy of environmental vibration is weak, a power supply circuit and a vibration-driven energy harvester that convert environmental vibration into electric energy with a high efficiency are required.

Solution to Problem

A power supply circuit according to the 1st aspect that outputs an electric power input from a vibration-driven energy harvesting element to an external load, comprises: a rectifying circuit that rectifies an alternating current power input from the vibration-driven energy harvesting element; a first capacitor that accumulates a power output from the rectifying circuit; a chopper circuit that has a switching element controlling a chopper timing and has an input terminal connected to the first capacitor; and a control signal generation unit that supplies a control signal to the switching element, wherein: the control signal generation unit generates the control signal without referring to a voltage of the first capacitor.

The power supply circuit according to the 2nd aspect is in the power supply circuit according to the 1st aspect, it is preferable that the power supply circuit further comprising: a voltage conversion circuit that has an input terminal connected to an output terminal of the chopper circuit.

The power supply circuit according to the 3rd aspect is in the power supply circuit according to the 1st or 2nd aspect, it is preferable that the control signal generation unit generates the control signal having a constant cycle and duty ratio.

The power supply circuit according to the 4th aspect is in the power supply circuit according to the 3rd aspect, it is preferable that the cycle and duty ratio is determined based on the vibration-driven energy harvesting element and installation conditions of the vibration-driven energy harvesting element.

The power supply circuit according to the 5th aspect is in the power supply circuit according to the 1st or 2nd aspect, it is preferable that the control signal generation unit receives a state signal based on an amplitude of a vibration of the vibration-driven energy harvesting element and generates the control signal based on the state signal.

A vibration-driven energy harvester according to the 6th aspect, comprises the power supply circuit according to any one of the 1st to 4th aspects; and a vibration-driven energy harvesting element that supplies an electric power to the power supply circuit.

A vibration-driven energy harvester according to the 7th aspect, comprises: the power supply circuit according to 5th aspects; and a vibration-driven energy harvesting element that supplies an electric power to the power supply circuit and supplies the state signal to the control signal generation unit of the power supply circuit.

Advantageous Effects of Invention

According to the present invention, energy of environmental vibration can be converted into electric energy with a high efficiency.

DESCRIPTION OF EMBODIMENTS

First Embodiment

Figure 1:
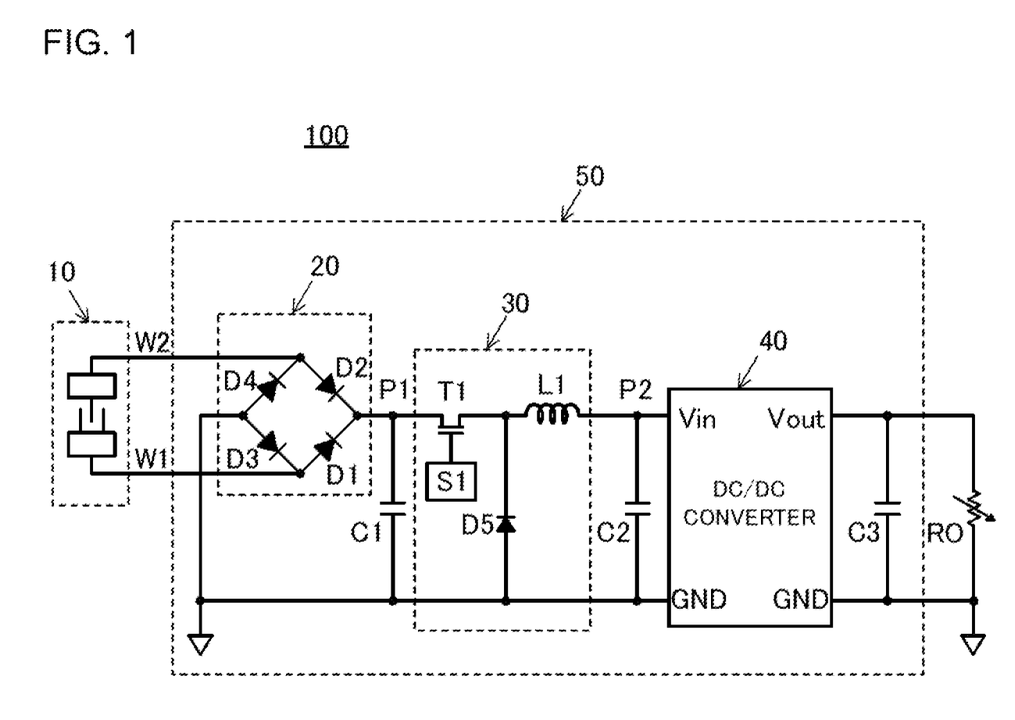
FIG. 1 is a schematic diagram showing a schematic configuration of a power supply circuit 50 and a vibration-driven energy harvester 100 of a first embodiment according to the present invention.

Now, a first embodiment according to the present invention will be described with reference to the drawings. FIG. 1 is a schematic diagram showing a schematic configuration of a power supply circuit 50 and a vibration-driven energy harvester 100 of the first embodiment according to the present invention. The vibration-driven energy harvester 100 includes a vibration-driven energy harvesting element 10 that generates an alternating current power due to environmental vibration, and the power supply circuit 50 that extracts the generated alternating current power and outputs to external equipment and the like.

The power supply circuit 50 includes a rectifying circuit 20, a first capacitor C1, a chopper circuit 30, a second capacitor C2, a voltage conversion circuit 40, and a third capacitor C3.

The vibration-driven energy harvesting element 10 is a capacitance-type power generation element (electret-type power generation element) including electret electrodes, as one example, and the outline thereof will be described with reference to FIG. 2.

The vibration-driven energy harvesting element 10 has a first electrode 11 which is a movable electrode and a second electrode 12 which is a fixed electrode. The first electrode 11 is a comb electrode having two comb portions 15 as one example, and the second electrode 12 is a comb electrode having three comb portions 16 as one example.

The comb portions 15 of the first electrode 11 and the comb portions 16 of the second electrode 12 have a predetermined thickness in the Z direction in the figure. The first electrode 11 and the second electrode 12 face each other in portions where they mesh with each other. The first electrode 11 and the second electrode 12 can be manufactured, for example, as a MEMS structure with silicon as a base material.

In the comb portions 16 of the second electrode 12, surface regions 17 on sides facing the comb portions 15 of the first electrode 11 have electrets with negative charges formed by being subjected to a known charging process (for example, a charging process described in Japanese Patent Laid-Open Publication No. 2014-049557).

Due to the electretization, the comb portions 16 of the second electrode 12 are semi-permanently charged. As a result, in the comb portions 15 of the first electrode 11 facing the electretized electrode, induced charges having characteristics opposite to those of the charges of the electretized electrode, that is, positive induced charges are induced.

The second electrode 12 is fixedly held by an insulating support frame 13.

On the other hand, the first electrode 11 is held by a holder 14 (an electrode holding portion 14a, connecting portions 14b, fixing portions 14c) to vibrate with respect to the support frame 13 in the vertical direction (X direction) in the figure. The holder 14 includes the electrode holding portion 14a that holds the first electrode 11, the fixing portions 14c that are fixed to the support frame 13, and the flexible connecting portions 14b that connect the electrode holding portion 14a to the fixing portions 14c.

The connecting portion 14b is a thin piece made of a flexible material such as metal, having a small thickness in the X direction and a large thickness in the Z direction in FIG. 1. When vibration is applied to the support frame 13 from outside, the two connecting portions 14b provided on the left and right of the electrode holding portion 14a in the figure are bent, so that the electrode holding portion 14a vibrates in the X direction with respect to the support frame 13. As a result, the first electrode 11 held by the electrode holding portion 14a vibrates in the X direction with respect to the second electrode 12 fixed to the support frame 13.

The vibration between the first electrode 11 and the second electrode 12 in the X direction increases or decreases areas of surfaces where the comb portions 15 of the first electrode 11 and the comb portions 16 of the second electrode 12 face each other. This results in a change in areas of the facing portions between the first electrode 11 and the second electrode 12, a change in charges induced by the electrets, and a change in a potential difference between the first electrode 11 and the second electrode 12 to generate an electromotive force. Thus, an electric power is generated by the vibration-driven energy harvesting element 10.

The power generation efficiency of the vibration-driven energy harvesting element 10 depends on an amplitude of the relative vibration between the first electrode 11 and the second electrode 12. That is, in principle, the larger the amplitude of the relative vibration between the first electrode 11 and the second electrode 12, the higher the power generation efficiency. However, due to restrictions on a mechanical structure of the vibration-driven energy harvesting element 10, an excessive large amplitude would cause an increased mechanical resistance associated with the vibration. Thus, the vibration-driven energy harvesting element 10 has an amplitude (optimum amplitude) that maximizes the power generation efficiency, which depends on the structure of the vibration-driven energy harvesting element 10. Hereinafter, the amplitude of the relative vibration between the first electrode 11 and the second electrode 12 is simply referred to as the amplitude of the vibration-driven energy harvesting element 10.

Of two output lines through which an alternating current voltage is output from the vibration-driven energy harvesting element 10, an output line W1 connected to the first electrode 11 is connected to an anode of a first diode D1 and a cathode of a third diode D3 constituting the full-wave rectifying type rectifying circuit 20 having a diode bridge type structure in FIG. 1. On the other hand, an output line W2 connected to the second electrode 12 is connected to an anode of a second diode D2 and a cathode of a fourth diode D4. A cathode of the first diode D1 and a cathode of the second diode D2 are connected to an output point P1 of the rectifying circuit 20. An anode of the third diode D3 and an anode of the fourth diode D4 are connected to a ground of the power supply circuit 50.

Due to a rectifying action of the rectifying circuit 20, a positive potential power is output from the output point P1 of the rectifying circuit 20. This electric power is supplied to the chopper circuit 30 while being accumulated in the first capacitor C1 having one end connected to the output point P1 of the rectifying circuit 20 and the other end connected to the ground. The output point P1 of the rectifying circuit 20 is also an input point P1 of the chopper circuit 30.

As an example of controlling a chopper timing, the chopper circuit 30 of the first embodiment includes a switching element T1 which is an nMOS transistor (nMOSFET) and a control signal generation unit S1 that supplies a control signal having a constant cycle and duty ratio to a switching element T1. Therefore, the switching element T1 is turned on at a constant cycle and a constant duty ratio (that is, at a constant time ratio).

When the switching element T1 is turned on, the current (electrical energy) accumulated in the first capacitor C1 passes through the switching element T1 and the coil L1 to the second capacitor C2, which is connected to an output point P2 of the chopper circuit 30. Then, electric energy is converted into magnetic energy and accumulated in the coil L1. On the other hand, a cathode of a rectifying diode D5 is connected to the switching element T1 side. Thus, no current flows through the rectifying diode D5, since the rectifying diode D5 is reverse-biased.

When the switching element T1 is turned off, the magnetic energy accumulated in the coil L1 is converted into electric energy due to a self-inductance of the coil L1 and transferred to the second capacitor C2 as electric energy (current). In this case, the direction of the current is from the coil L1 through the second capacitor C2 and the rectifying diode D5 and then back to the coil L1, so that rectifying diode D5 is forward-biased and does not block the current.

The electric power output from the chopper circuit 30 is accumulated in the second capacitor C2 and then output from the second capacitor C2 to an input terminal Vin of the voltage conversion circuit 40.

The voltage conversion circuit 40 converts the voltage, which is output from the inverting chopper circuit 30 and is input to the input terminal Vin, so that a voltage output from an output terminal Vout to an external load R0 has a predetermined positive constant value. As the voltage conversion circuit 40, a general switching-regulator-type DC/DC converter may be used. A third capacitor C3 is provided between the output terminal Vout of the voltage conversion circuit 40 and the ground, thereby making the output voltage from the voltage conversion circuit 40 smoother.

Note that the voltage conversion circuit 40 is a circuit for converting the power output from the chopper circuit 30, into a voltage suitable for the external load R0. Therefore, when the voltage suitable for the external load R0 matches the output voltage of the chopper circuit 30 or when the external load R0 itself has a function of converting the voltage, it is not necessary for the power supply circuit 50 to include the voltage conversion circuit 40. In this case, it is not necessary for the power supply circuit 50 to include the second capacitor C2 and the third capacitor C3 when the external load R0 has capacitors corresponding to the second capacitor C2 and the third capacitor C3.

As described above, in order to maximize the power generation efficiency of the vibration-driven energy harvesting element 10, it is preferable to vibrate the vibration-driven energy harvesting element 10 with an optimum amplitude. However, when the first capacitor C1 is charged and the voltage of the first capacitor C1 has an excessive high value, an electric resistance of the first capacitor C1 against the vibration-driven energy harvesting element 10 increases, which leads to an increase in a load of the vibration-driven energy harvesting element 10 to decrease the amplitude and thus the power generation efficiency of the vibration-driven energy harvesting element 10.

On the other hand, when the first capacitor C1 is discharged and the voltage of the first capacitor C1 has an excessive low value, an electric resistance of the first capacitor C1 against the vibration-driven energy harvesting element 10 decreases. Therefore, the load of the vibration-driven energy harvesting element 10 decreases and the amplitude of the vibration-driven energy harvesting element 10 increases excessively. As a result, the mechanical resistance increases to waste the energy of vibration. Consequently, the power generation efficiency decreases.

Therefore, it is desirable that the chopper circuit 30 transfers a moderate amount of electric energy appropriate to the power generation capacity of the vibration-driven energy harvesting element 10 from the first capacitor C1 to the second capacitor C2 which is connected to the output point P2 of the chopper circuit 30.

As described above, the chopper circuit 30 of the first embodiment includes the control signal generation unit S1 that generates a control signal having a constant cycle and duty ratio. Then, the control signal having the constant cycle and duty ratio is supplied from the control signal generation unit S1 to the switching element T1.

With this configuration, the chopper circuit 30 can transfer a certain amount of electric energy from the first capacitor C1 to the second capacitor C2. Then, by setting the cycle and duty ratio of the control signal generated by the control signal generation unit S1 to be optimum values in accordance with the power generation amount of the vibration-driven energy harvesting element 10, the amount of the electric energy transferred from the first capacitor C1 to the second capacitor C2 can be set to an optimum value. As a result, the amplitude of the vibration-driven energy harvesting element 10 can be maintained at an optimum value and the power generation efficiency of the vibration-driven energy harvesting element 10 can thus be increased.

Note that since a power generation amount of the vibration-driven energy harvesting element 10 can be predicted based on a configuration of the vibration-driven energy harvesting element 10 and conditions (vibration state or even temperature environment and the like) of a place where the vibration-driven energy harvester 100 including the vibration-driven energy harvesting element 10 is installed, it is desirable to determine the cycle and duty ratio of the control signal generated by the control signal generation unit S1 based on the configuration of the vibration-driven energy harvesting element 10 and the installation conditions of the vibration-driven energy harvesting element 10.

The control signal generation unit S1 includes an oscillation circuit and a circuit that outputs a signal generated by the oscillation circuit to the switching element T1. Various known circuits can be applied for this purpose. Further, a power to the control signal generation unit S1 may be supplied from the chopper circuit 30 itself, as in a control signal generation unit S1a described in a third embodiment described later.

Note that the voltage value of the first capacitor C1 is correlated with the amplitude of the vibration-driven energy harvesting element 10, as described above. Thus, the on and off control of the switching element T1 may be performed based on the voltage value of the first capacitor C1, instead of the configuration of the first embodiment. However, the voltage value of the first capacitor C1 pulsates due to a pulsed power supplied from the vibration-driven energy harvesting element 10. Additionally, a delay time occurs due to the charging time of the first capacitor C1 until the amplitude of the vibration-driven energy harvesting element 10 is reflected in the voltage value of the first capacitor C1.

Therefore, in the control based on the voltage value of the first capacitor C1, an error is likely to occur due to the pulsation of the voltage value of the first capacitor C1 and the delay time described above. It is thus difficult to perform an accurate control.

Thus, in the above-described first embodiment, the control signal generation unit S1 is configured to generate the control signal without referring to the voltage of the first capacitor C1, which enables to set the amount of electric energy transferred from the first capacitor C1 to the second capacitor C2 to an optimum value.

Modification of Vibration-Driven Energy Harvesting Element

Figure 2:
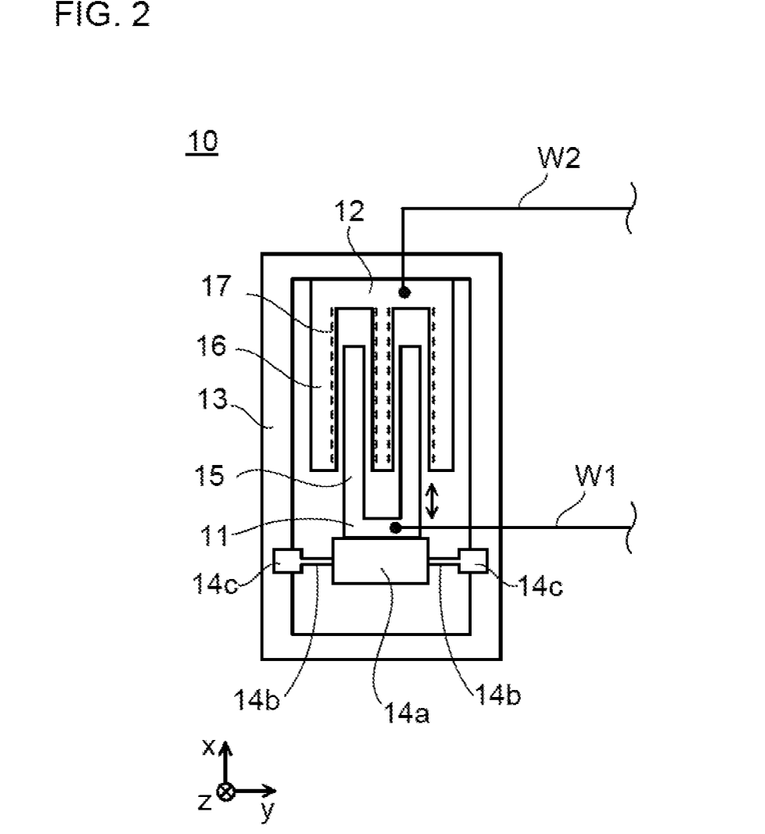
FIG. 2 is a view schematically showing a vibration-driven energy harvesting element 10 included in the vibration-driven energy harvester 100.
Figure 3:
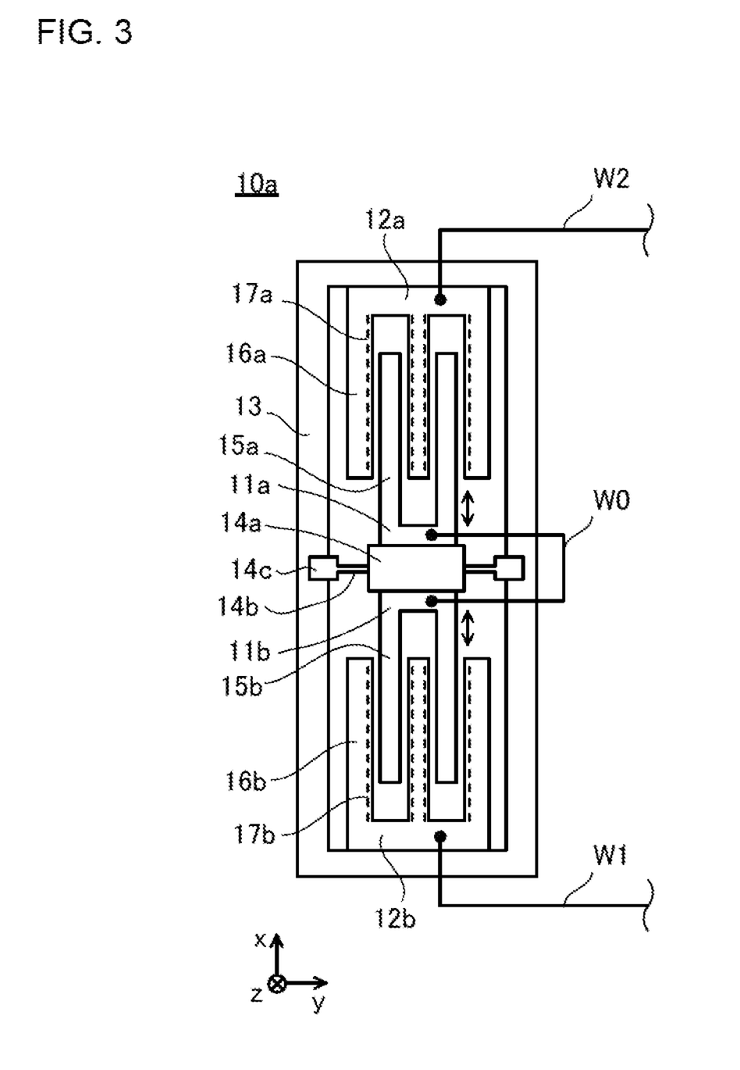
FIG. 3 is a view showing a first modification of the vibration-driven energy harvesting element.

FIG. 3 is a schematic view showing a vibration-driven energy harvesting element 10a in a modification. In addition to the above-described vibration-driven energy harvesting element 10 in FIG. 2, the vibration-driven energy harvesting element 10a includes one more vibration-driven energy harvesting element 10 on the lower side in the figure, and two vibration-driven energy harvesting elements 10 are arranged in parallel in a vertically inverted manner with a holder 14 interposed therebetween.

Second electrodes 12a and 12b, which are two fixed electrodes, are internally fixed on ends on the +X side and the −X side of the support frame 13, respectively. On the other hand, first electrodes 11a and 11b, which are two movable electrodes, are provided on the +X side and the −X side of an electrode holding portion 14a that constitutes the holder 14, respectively. The first electrode 11a and 11b are connected to each other via a wire W0. In the respective comb portions 16a, 16b of the second electrodes 12a, 12b, surface regions 17a, 17b on sides facing the comb portions 15a, 15b of the first electrode 11a, 11b have electrets with negative charges formed therein.

When the holder 14 vibrates due to vibration from outside, the first electrodes 11a, 11b integrally vibrate in the X direction with respect to the second electrodes 12a, 12b. In each phase of vibration, when an area where the first electrode 11a and the second electrode 12a face each other increases, an area where the first electrode 11b and the second electrode 12b face each other decreases. Therefore, with respect to the first electrodes 11a and 11b which are connected to each other by the wire W0, voltages having mutually inverted phases are generated at the second electrodes 12a and 12b.

An output line W1 connected to the second electrode 12b is connected to an anode of a first diode D1 and a cathode of a third diode D3 constituting the rectifying circuit 20 in FIG. 1. An output line W2 connected to the second electrode 12a is connected to an anode of a second diode D2 and a cathode of a fourth diode D4.

The vibration-driven energy harvesting element 10a of this modification can provide the amount of power generation larger than that of the vibration-driven energy harvesting element 10 shown in FIG. 2, per device area and device volume.

Second Embodiment

Figure 4:
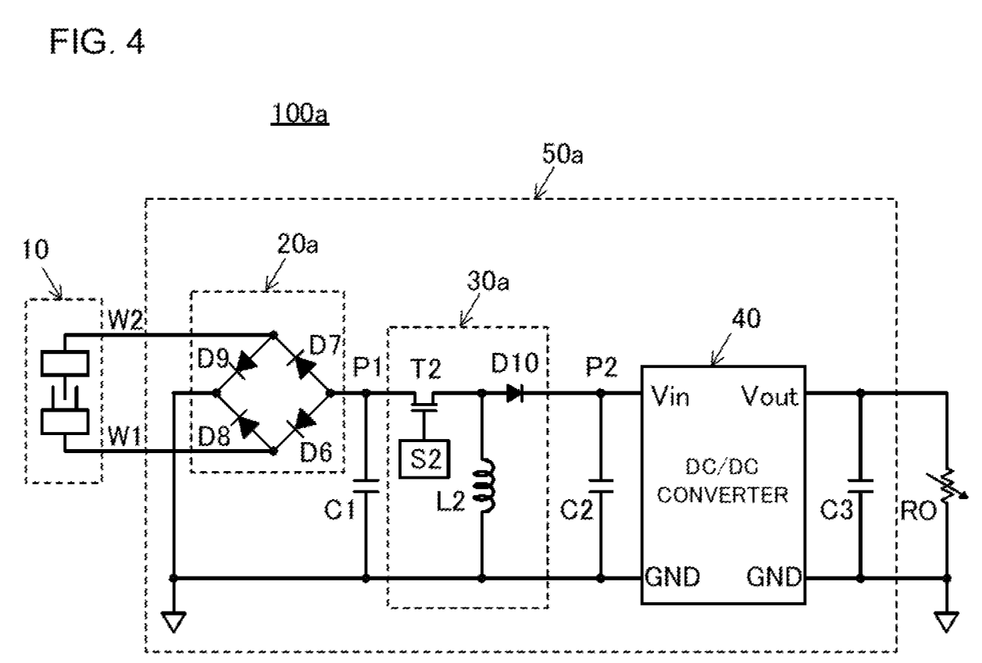
FIG. 4 is a schematic diagram showing a schematic configuration of a power supply circuit 50*a* and a vibration-driven energy harvester 100*a* of a second embodiment according to the present invention.

FIG. 4 is a schematic diagram showing a schematic configuration of a power supply circuit 50a and a vibration-driven energy harvester 100a of the second embodiment according to the present invention. Note that the same parts as those in the first embodiment described above are designated by the same reference numerals, and description thereof will be omitted.

The power supply circuit 50a of the second embodiment differs from the above-described first embodiment in that the power supply circuit 50a includes a rectifying circuit 20a that outputs a negative voltage and a chopper circuit 30a that converts the negative voltage from the rectifying circuit 20a into a positive voltage. That is, an alternating current power input from the vibration-driven energy harvesting element 10 is rectified by the rectifying circuit 20a into a pulse power having a negative voltage, and accumulated in the first capacitor C1. Then, the pulse power is converted into a positive voltage by the chopper circuit 30a and accumulated in the second capacitor C2. Remaining configurations are similar to those of the above-described first embodiment.

Note that the chopper circuit 30a is hereinafter also referred to as an inverting chopper circuit 30a because the chopper circuit 30a inverts a negative input voltage into a positive output voltage and outputs the positive output voltage.

As an example of controlling a chopper timing, the chopper circuit 30 includes a switching element T2 which is an nMOS transistor (nMOSFET) and a control signal generation unit S2 that supplies a control signal having a constant cycle and duty ratio to a switching element T2.

Therefore, the switching element T2 is turned on at a constant cycle and a constant duty ratio (that is, at a constant time ratio). In the same manner as the control signal generation unit S1 shown in FIG. 1, the control signal generation unit S2 includes an oscillation circuit and a circuit that outputs a signal generated by the oscillation circuit to the switching element T2. A variety of known circuits can be applied for this purpose.

A negative voltage power is accumulated in the first capacitor C1. Thus, when the switching element T2 is turned on, the power accumulated in the first capacitor C1 flows through the first capacitor C1, a ground line, the coil L2, and switching element T2 in this order as a current. Then, electric energy is converted into magnetic energy and accumulated in the coil L2. On the other hand, since an anode of a rectifying diode D10 is connected to the switching element T2 side, the rectifying diode D10 is reverse-biased and no current flows through the rectifying diode D10 and the second capacitor C2.

When the switching element T2 is turned off, the magnetic energy accumulated in the coil L2 is converted into electric energy due to a self-inductance of the coil L2. At this time, the rectifying diode D10 is forward-biased because a positive voltage is on the side of the coil L2 opposite to the ground. Therefore, the current flows through the rectifying diode D10 to the output point P2 of the inverting chopper circuit 30a and electric energy having a positive voltage is accumulated in the second capacitor C2.

In the above-described manner, the inverting chopper circuit 30a converts the negative voltage power into the positive voltage power.

Also in the second embodiment, the voltage conversion circuit 40 and remaining configurations are similar to those in the above-described first embodiment.

Note that also in the second embodiment, the vibration-driven energy harvesting element 10a of the modification shown in FIG. 3 may be used instead of the vibration-driven energy harvesting element 10.

Also in the second embodiment, the chopper circuit (inverting chopper circuit 30a) includes the control signal generation unit S2 that generates a control signal having a constant cycle and duty ratio so that a constant amount of electric energy can be transferred from the first capacitor C1 to the second capacitor C2. Then, by setting the cycle and duty ratio of the control signal generated by the control signal generation unit S2 to optimum values in accordance with the power generation amount of the vibration-driven energy harvesting element 10, the amount of the electric energy transferred from the first capacitor C1 to the second capacitor C2 can be set to an optimum value. As a result, the amplitude of the vibration-driven energy harvesting element 10 can be maintained at an optimum value and the power generation efficiency of the vibration-driven energy harvesting element 10 can thus be increased.

Third Embodiment

Figure 5:
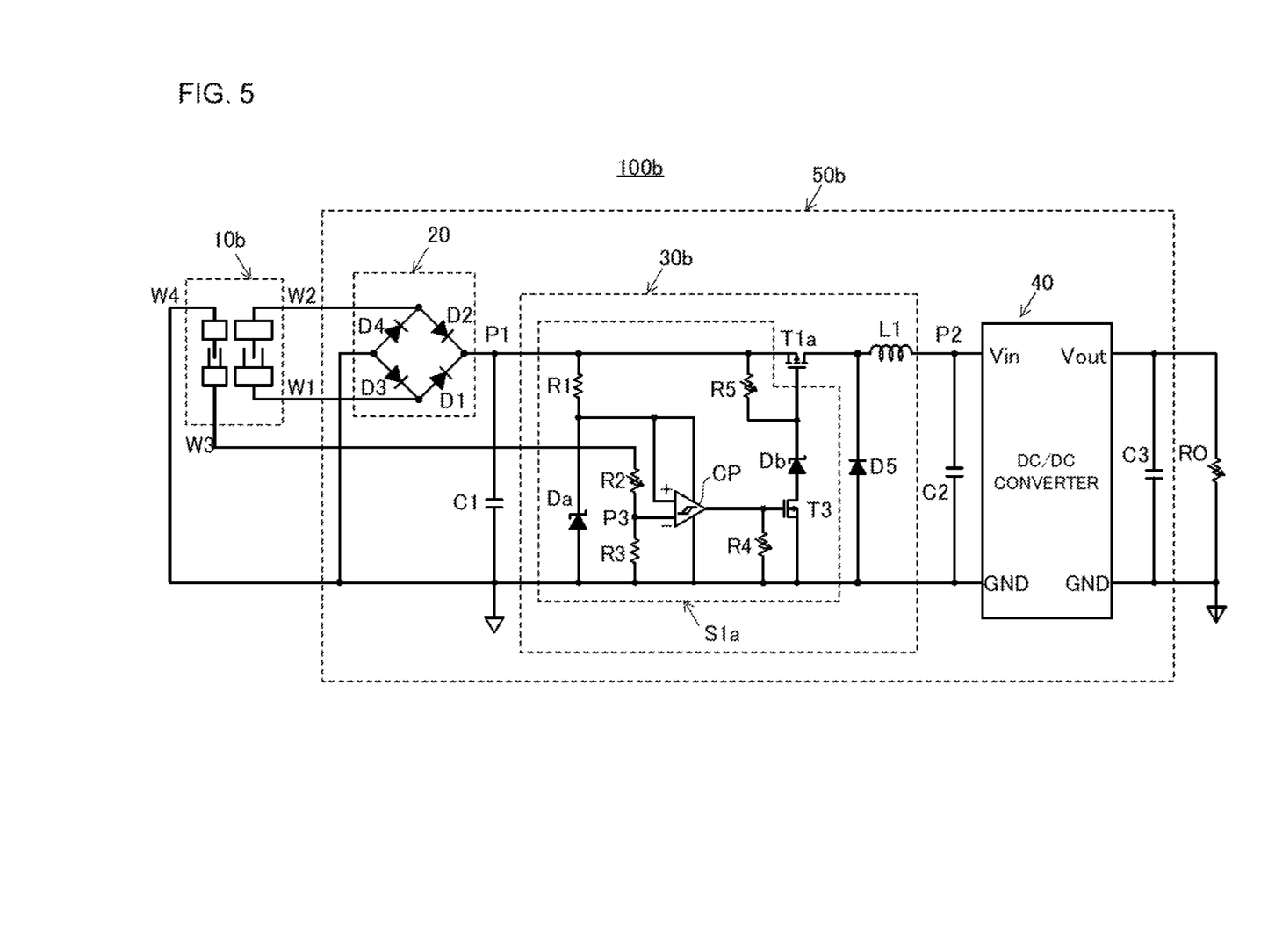
FIG. 5 is a schematic diagram showing a schematic configuration of a power supply circuit 50*b* and a vibration-driven energy harvester 100*b* of a third embodiment according to the present invention.

FIG. 5 is a schematic diagram showing a schematic configuration of a power supply circuit 50b and a vibration-driven energy harvester 100b of a third embodiment according to the present invention. Note that the same parts as those in the first embodiment described above are designated by the same reference numerals, and description thereof will be omitted.

The power supply circuit 50b and the vibration-driven energy harvester 100b of the third embodiment differ from those of the above-described first embodiment in that a control signal generation unit S1a receives a state signal based on an amplitude of a vibration of a vibration-driven energy harvesting element 10b and generates a control signal based on the state signal.

Figure 6:
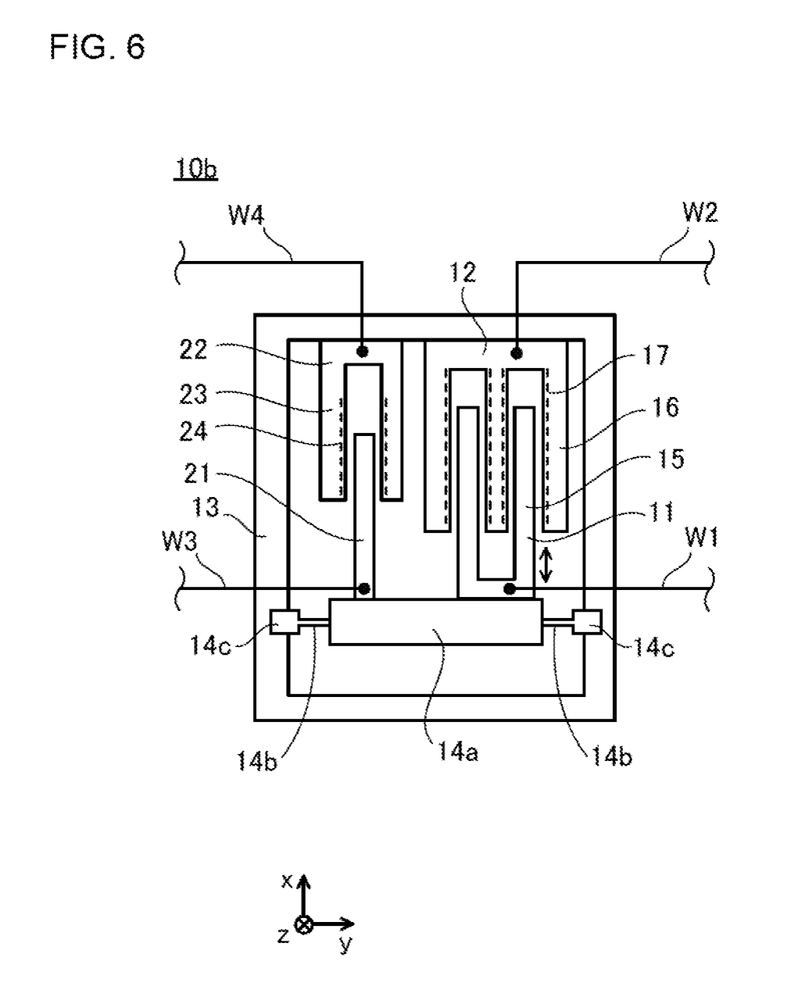
FIG. 6 is a view showing a second modification of the vibration-driven energy harvesting element.

FIG. 6 is a view showing an outline of the vibration-driven energy harvesting element 10b that outputs the state signal. The same parts as those of the vibration-driven energy harvesting element 10 shown in FIG. 2 are designated by the same reference numerals, and description thereof will be omitted.

In addition to the vibration-driven energy harvesting element 10 shown in FIG. 2, the vibration-driven energy harvesting element 10b has another electrode pair. That is, the vibration-driven energy harvesting element 10b has a pair of a third electrode 21 and a fourth electrode 22 arranged parallel to a pair of a first electrode 11 and a second electrode 12 and offset in the Y direction. Configurations of the third electrode 21 and the fourth electrode 22 are the same as those of the first electrode 11 and the second electrode 12, respectively. Further, in comb portions 23 of the fourth electrode 22, surface regions 24 on sides facing the third electrode 21 have electrets with negative charges formed therein.

The fourth electrode 22 is fixedly held by an insulating support frame 13. On the other hand, the third electrode 21 is held by a holder 14 to vibrate with respect to the support frame 13 in the vertical direction (X direction) in the figure, integrally with the first electrode 11. Therefore, when the vibration-driven energy harvesting element 10b vibrates in the X direction, a voltage occurs between the third electrode 21 and the fourth electrode 22, the voltage having the same sign as that of a voltage generated between the first electrode 11 and the second electrode 12.

However, as shown in FIG. 6, a length of the third electrode 21 and the fourth electrode 22 in the X direction is shorter than a length of the first electrode 11 and the second electrode 12 in the X direction, and an area of facing portions between the electrodes 21, 22 is also smaller. Therefore, an electric power generated between the third electrode 21 and the fourth electrode 22 due to a vibration is smaller than that generated between the first electrode 11 and the second electrode 12.

An output line W3 from the third electrode 21 is connected to one end of a resistance element R2 in the control signal generation unit S1a in FIG. 5. On the other hand, an output line W4 from the fourth electrode 22 is connected to a ground of the power supply circuit 50b.

Note that the output line W3 may be connected to the fourth electrode 22 instead of the third electrode 21, and the output line W4 may be connected to the third electrode 21 instead of the fourth electrode 22.

Figure 7:
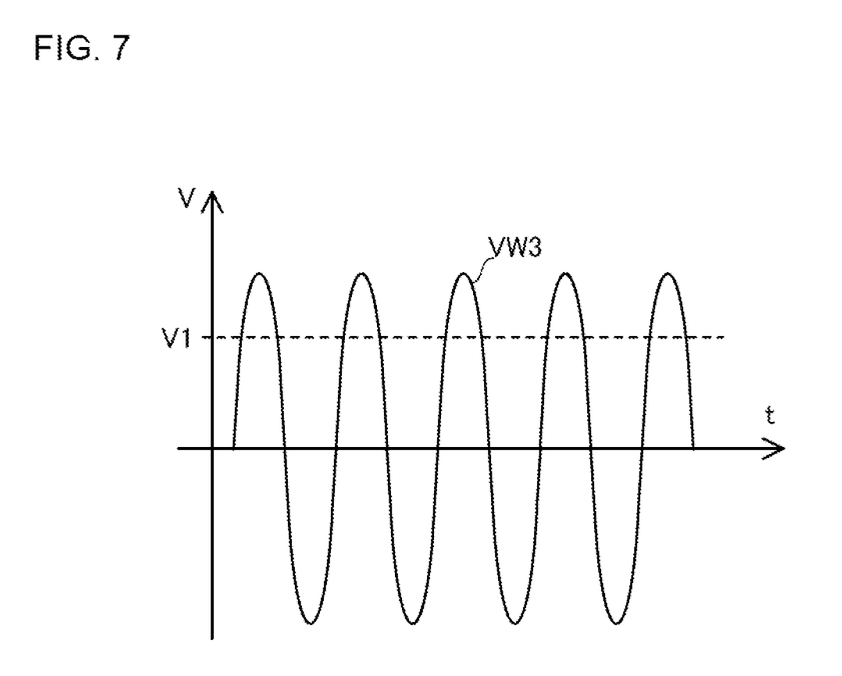
FIG. 7 is a graph showing an output voltage V3P of an output line W3.

FIG. 7 is a graph showing a voltage VW3 output from the output line W3. The horizontal axis of the graph represents time t and the vertical axis represents voltage V. The voltage VW3 is an alternating current voltage that fluctuates almost sinusoidally with a cycle of a vibration of the vibration-driven energy harvesting element 10b. An amplitude of the voltage VW3 is positively correlated with an amplitude of the vibration between the third electrode 21 and the fourth electrode 22 of the vibration-driven energy harvesting element 10b. As described above, the amplitude of the vibration between the third electrode 21 and the fourth electrode 22 is similar to the amplitude of the vibration between the first electrode 11 and the second electrode 12 (amplitude of the vibration-driven energy harvesting element 10b) which generates an electric power supplied to the power supply circuit 50b.

Therefore, the amplitude of the voltage VW3 is based on the amplitude of the vibration-driven energy harvesting element 10b. In other words, the voltage VW3 is a state signal based on the amplitude of the vibration of the vibration-driven energy harvesting element 10b.

When the vibration-driven energy harvesting element 10b vibrates at the optimum amplitude that maximizes the power generation efficiency, the voltage amplitude of the voltage VW3 matches the optimum voltage V1 shown by the broken line in FIG. 7.

When the voltage amplitude of the voltage VW3 is larger than the optimum voltage V1, the vibration-driven energy harvesting element 10b vibrates with an amplitude larger than the optimum amplitude. As a result, the power generation efficiency decreases. Therefore, it is desirable to increase a load of the vibration-driven energy harvesting element 10b by increasing the voltage of the first capacitor C1 so that the amplitude of the vibration-driven energy harvesting element 10b is close to the optimum amplitude. For this purpose, it is desirable to turn off a switching element T1a in a chopper circuit 30b.

On the other hand, when the voltage amplitude of the voltage VW3 is smaller than the optimum voltage V1, the vibration-driven energy harvesting element 10b vibrates with an amplitude smaller than the optimum amplitude. As a result, the power generation efficiency decreases also in this case. Therefore, it is desirable to decrease a load of the vibration-driven energy harvesting element 10b by decreasing the voltage of the first capacitor C1 so that the amplitude of the vibration-driven energy harvesting element 10b is close to the optimum amplitude. For this purpose, it is desirable to turn on the switching element T1a in the chopper circuit 30b to transfer charges accumulated in the first capacitor C1 to the second capacitor C2.

Therefore, by controlling the switching element T1a in the chopper circuit 30b based on the voltage VW3, the vibration-driven energy harvesting element 10b can be vibrated with the optimum amplitude that maximizes the power generation efficiency.

The control signal generation unit S1a includes a circuit that controls the switching element T1a as described above.

One end of a resistance element R1 is connected to an input point P1 of the chopper circuit 30b, the other end of the resistance element R1 is connected to a cathode of a Zener diode Da, and an anode of the Zener diode Da is connected to a ground. A voltage of the cathode of the Zener diode Da is a voltage resulting from a voltage drop of a voltage at the input point P1 by the resistor R1. However, the voltage is kept at a positive constant value (an absolute value of a breakdown voltage of the Zener diode Da) if the voltage is higher than the absolute value of the breakdown voltage of the Zener diode Da.

One end of the resistance element R3 is connected to a voltage dividing point P3, which is the other end of the resistance element R2 opposite to the one end to which the voltage VW3 is input, and the other end of the resistance element R3 is connected to a ground. Resistance values of the resistance elements R2 and R3 constituting the voltage divider are set such that the voltage at the voltage dividing point P3 matches the absolute value of the breakdown voltage of the Zener diode Da when the voltage VW3 substantially matches the above-described optimum voltage V1. In order to facilitate this setting, at least one of the resistance elements R2, R3 (in FIG. 5, the resistance element R2) is desirably a variable resistance, as shown in FIG. 5.

Then, the voltage at the voltage dividing point P3, which is proportional to the voltage VW3, and the voltage of the cathode of the Zener diode Da are input to the comparator circuit CP for voltage comparison to determine whether the voltage VW3 is equal to or higher than, or is equal to or lower than, the optimum voltage V1 that maximizes the power generation efficiency of the vibration-driven energy harvesting element 10.

The voltage of the cathode of the Zener diode Da is input to a plus-side input of the comparator circuit CP. On the other hand, the voltage at the voltage dividing point P3 is input to a minus-side input.

Further, the voltage of the cathode of the Zener diode Da is input to a plus-side power supply of the comparator circuit CP, and a ground is connected to a minus-side power supply.

If the voltage of the voltage dividing point P3 is higher than the voltage of the cathode of the Zener diode Da, the comparator circuit CP outputs a zero voltage (ground potential).

If the voltage of the voltage dividing point P3 is lower than the voltage of the cathode of the Zener diode Da, the comparator circuit CP outputs a positive voltage.

The output of the comparator circuit CP is input to a gate of an nMOS transistor (nMOSFET) T3.

If the output of the comparator circuit CP is positive, the transistor T3 is turned on and a voltage drop due to a current flowing through the resistance element R5 causes a voltage of a gate of the switching element T1a, which is a pMOS transistor (pMOSFET), to become a lower (negative) voltage than a voltage of a source of the switching element T1a. As a result, the switching element T1a is turned on. The resistance element R5 is preferably a variable resistance so that the amount of the voltage drop can be adjusted.

On the other hand, if the output of the comparator circuit CP is zero (ground potential), the transistor T3 is turned off. As a result, the voltage of the gate of the switching element T1a, which is a pMOS transistor, becomes equal to the voltage of the source of the switching element T1a. Thus, the switching element T1a is turned off.

Note that the resistance element R4 arranged between the gate of the transistor T3 and the ground is a resistance element for discharging the output of the comparator circuit CP temporarily accumulated in the gate of the transistor T3, to the ground. The resistance element R4 is preferably a variable resistor for adjustment of the discharge time.

Further, the second Zener diode Db is an element for turning off the switching element T1a by cutting off the second Zener diode Db and the resistance element R5 when the absolute value of the voltage of the input point P1 is small and an operation of the nMOS transistor T3 is unstable.

As described above, the control signal generation unit S1a receives the voltage VW3 which is the state signal based on the amplitude of the vibration of the vibration-driven energy harvesting element 10b, generates the control signal based on the voltage VW3, and supplies the control signal to the switching element T1a. Thus, the power supply circuit 50b and the vibration-driven energy harvester 100b of the third embodiment can maintain the amplitude of the vibration-driven energy harvesting element 10b at the optimum value, so that the power generation efficiency of the vibration-driven energy harvesting element 10b can be improved.

Fourth Embodiment

Figure 8:
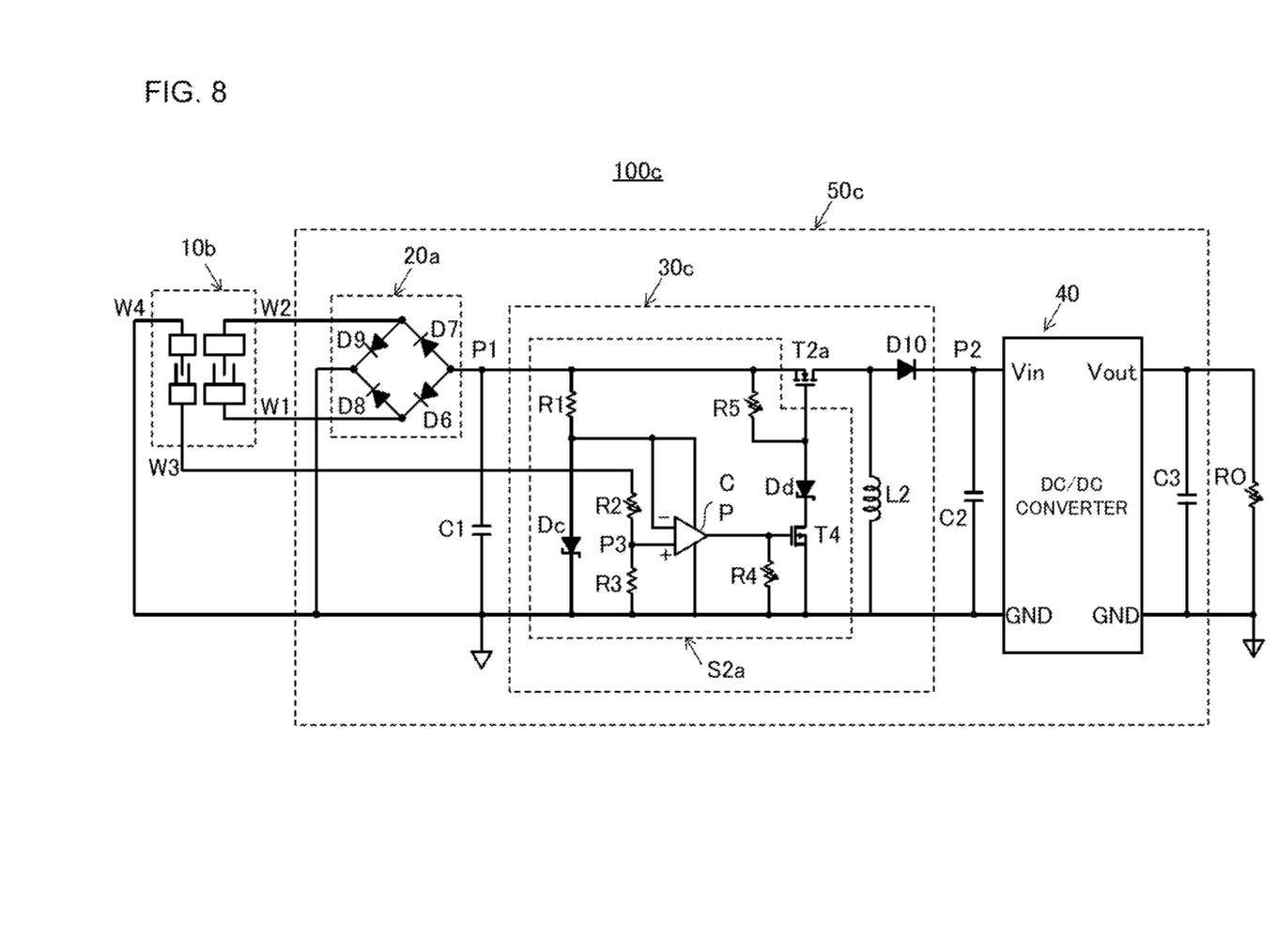
FIG. 8 is a schematic diagram showing a schematic configuration of a power supply circuit 50*c* and a vibration-driven energy harvester 100*c* of a fourth embodiment according to the present invention.

FIG. 8 is a schematic diagram showing a schematic configuration of a power supply circuit 50c and a vibration-driven energy harvester 100c of the fourth embodiment according to the present invention. Note that the same parts as those in the second and third embodiments described above are designated by the same reference numerals, and description thereof will be omitted.

The power supply circuit 50c and the vibration-driven energy harvester 100c of the fourth embodiment are similar to the above-described second embodiment in that the power supply circuit 50c includes a rectifying circuit 20a that outputs a negative voltage and a chopper circuit 30c that converts the negative voltage from the rectifying circuit 20a into a positive voltage. Note that the fourth embodiment differs from the second embodiment in that a control signal generation unit S2a provided in the chopper circuit 30c receives a state signal based on an amplitude of a vibration of a vibration-driven energy harvesting element 10b and generates a control signal based on the state signal, in the same manner as in the above-described third embodiment.

A vibration-driven energy harvesting element included in the vibration-driven energy harvester 100c of the fourth embodiment is similar to the vibration-driven energy harvesting element 10b shown in FIG. 6, and description thereof will be omitted.

The control signal generation unit S2a receives a state signal based on an amplitude of a vibration of a vibration-driven energy harvesting element 10b and generates a control signal based on the state signal. The configuration of the control signal generation unit S2a is similar to the configuration of the control signal generation unit S1a shown in FIG. 5; however, while the chopper circuit 30b in FIG. 5 is a circuit that operates at a positive voltage, the present embodiment shown in FIG. 8 includes an inverting chopper circuit 30c that converts a negative voltage into a positive voltage. Therefore, details of the configurations are different.

One end of a resistance element R1 is connected to an input point P1 of the inverting chopper circuit 30c, the other end of the resistance element R1 is connected to an anode of the Zener diode Dc, and a cathode of the Zener diode Dc is connected to a ground. A voltage of the anode of the Zener diode Dc is a voltage resulting from a voltage drop of a voltage at the input point P1 by the resistor R1. However, the voltage is kept at a negative constant value (a breakdown voltage of the Zener diode Dc) if the voltage is more negative than the breakdown voltage of the Zener diode Dc.

In the same manner as the above-described third embodiment, the other end of the output line W3 connected to a third electrode 21 of the vibration-driven energy harvesting element 10b is connected to an end of the resistance element R2, in the resistance element R2 and the resistance element R3 constituting the voltage divider. Further, resistance values of the resistance elements R2 and R3 are set such that the voltage at the voltage dividing point P3 matches the breakdown voltage of the Zener diode Dc when the absolute value of the voltage VW3 matches a negative value equivalent to the above-described optimum voltage V1 (hereinafter referred to as a negative optimum voltage VM).

Then, the voltage at the voltage dividing point P3, which is proportional to the voltage VW3, and the voltage of the anode of the Zener diode Dc are input to the comparator circuit CP for voltage comparison to determine whether the voltage VW3 is equal to or higher than, or is equal to or lower than, the negative optimum voltage VM that maximizes the power generation efficiency of the vibration-driven energy harvesting element 10.

A voltage of an anode of a Zener diode Dc is input to a minus-side input of the comparator circuit CP. On the other hand, the voltage of the voltage dividing point P3 is input to a plus-side input.

Further, a ground is connected to a plus-side power supply of the comparator circuit CP, and a voltage of the anode of the Zener diode Dc is input to a minus-side power supply.

If the voltage of the voltage dividing point P3 is more positive than the voltage of the cathode of the Zener diode Dc, the comparator circuit CP outputs a zero voltage (ground potential).

If the voltage of the voltage dividing point P3 is more negative than the voltage of the cathode of the Zener diode Dc, the comparator circuit CP outputs a negative voltage.

The output of the comparator circuit CP is input to a gate of a pMOS transistor (pMOSFET) T4.

If the output of the comparator circuit CP is negative, the transistor T4 is turned on, and a voltage drop due to a current flowing through the resistance element R5 causes a voltage of a gate of the switching element T2a, which is an nMOS transistor (nMOSFET), to become a positive voltage than a voltage of a source of the switching element T2a. As a result, the switching element T2a is turned on.

On the other hand, if the output of the comparator circuit CP is zero (ground potential), the transistor T4 is turned off. As a result, the voltage of the gate of the switching element T2a, which is an nMOS transistor, becomes equal to the voltage of the source of the switching element T2a. Thus, the switching element T2a is turned off.

Further, in the same manner as the second Zener diode Db of the third embodiment, the second Zener diode Dd is an element for turning off the switching element T2a by cutting off the second Zener diode Dd and the resistance element R5 when the absolute value of the voltage of the input point P1 is small and an operation of the pMOS transistor T4 is unstable.

As described above, the control signal generation unit S2a receives the voltage VW3 which is the state signal based on the amplitude of the vibration of the vibration-driven energy harvesting element 10b, generates the control signal based on the voltage VW3, and supplies the control signal to the switching element T2a. Thus, the power supply circuit 50c and the vibration-driven energy harvester 100c of the fourth embodiment can maintain the amplitude of the vibration-driven energy harvesting element 10b at the optimum value, so that the power generation efficiency of the vibration-driven energy harvesting element 10b can be improved.

Note that, also in the above-described third embodiment and fourth embodiment, it is possible to use a vibration-driven energy harvesting element in which electrodes are formed on both sides (+X side, −X side) of the holder 14 as shown in FIG. 3. In this case, another pair of the third electrode 21 and the fourth electrode 22 of the vibration-driven energy harvesting element 10b of FIG. 6 are also formed on the −X side of the holder 14, and the two third electrodes 21 are connected by a lead wire. Further, the output line W3 can be connected to a new fourth electrode provided on −X side of the holder 14. Alternatively, the third electrode 21 and the fourth electrode 22 may be provided only on the +X side of the holder 14 as in FIG. 6.

Effects of Embodiments (1) The power supply circuit 50 of each of the above-described embodiments and modifications outputs an electric power input from the vibration-driven energy harvesting element 10, 10a to an external load. The power supply circuit 50 includes the rectifying circuit 20 that rectifies an alternating current power input from the vibration-driven energy harvesting element 10, 10a; the first capacitor C1 that accumulates the power output from the rectifying circuit 20; the chopper circuit 30 that has the switching element T1, T2 controlling a chopper timing and has an input terminal connected to the first capacitor C1; and the control signal generation unit S1, S2 that supplies a control signal to the switching element T1, T2, wherein: the control signal generation unit S1, S2 generates the control signal without referring to a voltage of the first capacitor C1.

With this configuration, the amplitude of the vibration-driven energy harvesting element 10, 10a can be maintained at an optimum value. Thus, the power generation efficiency of the vibration-driven energy harvesting element 10, 10a can be improved so that energy of environmental vibration can be converted into electrical energy with a high efficiency.

(2) In (1), the power supply circuit 50 further includes the voltage conversion circuit 40 that has an input terminal connected to the output terminal of the chopper circuit 30. With this configuration, the power supply circuit 50 can output a voltage suitable for the external load R0. Thus, the power supply circuit 50 suitable for various external loads R0 can be provided.

(3) In (1) or (2), the control signal generation unit S1, S2 may generate the control signal having a constant cycle and duty ratio, and a constant amount of electric energy may be transferred from the first capacitor C1 to the second capacitor C2. Thus, the amplitude of the vibration-driven energy harvesting element 10, 10a can be maintained at more optimum values.

(4) In (3), the cycle and duty ratio may be determined based on the vibration-driven energy harvesting element 10, 10a and installation conditions of the vibration-driven energy harvesting element 10, 10a. Thus, the amplitude of the vibration-driven energy harvesting element 10, 10a can be maintained at a more optimum value.

(5) In (1) or (2), the control signal generation unit S1a, S2a may receive a state signal based on an amplitude of a vibration of the vibration-driven energy harvesting element 10b and generate the control signal based on the state signal. As a result, the amplitude of the vibration-driven energy harvesting element 10b can be maintained at a more optimum value, and the power generation efficiency can be further increased.

(6) The vibration-driven energy harvester 100, 100a according to each of the first embodiment and the second embodiment and the modifications described above includes the power supply circuit 50 according to any one of (1) to (4) and the vibration-driven energy harvesting element 10, 10a that supplies an electric power to the power supply circuit 50.

With this configuration, the amplitude of the vibration-driven energy harvesting element 10, 10a can be maintained at an optimum value. Thus, the power generation efficiency of the vibration-driven energy harvesting element 10, 10a can be improved so that energy of environmental vibration can be converted into electrical energy with a high efficiency.

(7) The vibration-driven energy harvester 100b, 100d according to each of the third embodiment and the fourth embodiment and the modifications described above includes the power supply circuit 50b, 50c according to (5) and the vibration-driven energy harvesting element 10b that supplies an electric power to the power supply circuit 50b, 50c.

With this configuration, the amplitude of the vibration-driven energy harvesting element 1b can be maintained at an optimum value. Thus, the power generation efficiency of the vibration-driven energy harvesting element 10b can be improved so that energy of environmental vibration can be converted into electrical energy with a high efficiency.

Although various embodiments and modifications have been described above, the present invention is not limited thereto. Additionally, the embodiments and modifications may be applied alone or in combination. Other aspects conceivable within the technical idea of the present invention are also included within the scope of the present invention.

The disclosure of the following priority application is herein incorporated by reference:
Japanese Patent Application No. 2018-105436 (filed May 31, 2018)

REFERENCE SIGNS LIST 100, 100a, 100b, 100c . . . vibration-driven energy harvester, 10, 10a, 10b vibration-driven energy harvesting element, 20, 20a . . . rectifying circuit, 30, 30a, 30b, 30c . . . chopper circuit, S1, S2, S1a, S2b . . . control signal generation unit, 40 . . . voltage conversion circuit, C1 . . . first capacitor, C2 . . . second capacitor, C3 . . . third capacitor, R0 . . . external load, T1, T2, T1a, T2a . . . switching element, CP . . . comparator circuit, Da, Dc . . . Zener diode

The invention claimed is:

1. A power supply circuit that outputs an electric power input from a vibration-driven energy harvesting element to an external load, comprising:
  a rectifying circuit that rectifies an alternating current power input from the vibration-driven energy harvesting element;
  a first capacitor that accumulates a power output from the rectifying circuit;
  a chopper circuit that has a switching element controlling a chopper timing and has an input terminal connected to the first capacitor; and
  a control signal generation unit that supplies a control signal to the switching element to vary the chopper timing, wherein:
  the control signal generation unit generates the chopper timing-varying control signal without referring to a voltage of the first capacitor.

2. The power supply circuit according to claim 1, further comprising:
  a voltage conversion circuit that has an input terminal connected to an output terminal of the chopper circuit.

3. A vibration-driven energy harvester, comprising:
  the power supply circuit according to claim 2; and
  a vibration-driven energy harvesting element that supplies an electric power to the power supply circuit.

4. The power supply circuit according to claim 2, wherein:
  the control signal generation unit receives a state signal based on an amplitude of a vibration of the vibration-driven energy harvesting element and generates the control signal based on the state signal.

5. A vibration-driven energy harvester, comprising:
  the power supply circuit according to claim 4; and
  a vibration-driven energy harvesting element that supplies an electric power to the power supply circuit and supplies the state signal to the control signal generation unit of the power supply circuit.

6. The power supply circuit according to claim 2, wherein:
  the control signal generation unit generates the control signal having a constant cycle and duty ratio.

7. A vibration-driven energy harvester, comprising:
  the power supply circuit according to claim 6; and
  a vibration-driven energy harvesting element that supplies an electric power to the power supply circuit.

8. The power supply circuit according to claim 6, wherein:
  the cycle and duty ratio are determined based on the vibration-driven energy harvesting element and installation conditions of the vibration-driven energy harvesting element.

9. A vibration-driven energy harvester, comprising:
  the power supply circuit according to claim 8; and
  a vibration-driven energy harvesting element that supplies an electric power to the power supply circuit.

10. The power supply circuit according to claim 1, wherein:
  the control signal generation unit generates the control signal having a constant cycle and duty ratio.

11. The power supply circuit according to claim 10, wherein:
  the cycle and duty ratio are determined based on the vibration-driven energy harvesting element and installation conditions of the vibration-driven energy harvesting element.

12. A vibration-driven energy harvester, comprising:
  the power supply circuit according to claim 11; and
  a vibration-driven energy harvesting element that supplies an electric power to the power supply circuit.

13. A vibration-driven energy harvester, comprising:
  the power supply circuit according to claim 10; and
  a vibration-driven energy harvesting element that supplies an electric power to the power supply circuit.

14. The power supply circuit according to claim 1, wherein:
  the control signal generation unit receives a state signal based on an amplitude of a vibration of the vibration-driven energy harvesting element and generates the control signal based on the state signal.

15. A vibration-driven energy harvester, comprising:
  the power supply circuit according to claim 14; and
  a vibration-driven energy harvesting element that supplies an electric power to the power supply circuit and supplies the state signal to the control signal generation unit of the power supply circuit.

16. A vibration-driven energy harvester, comprising:
  the power supply circuit according to claim 1; and
  a vibration-driven energy harvesting element that supplies an electric power to the power supply circuit.

* * * * *